United States Patent [19]

Lee

[11] 4,068,225

[45] Jan. 10, 1978

[54] APPARATUS FOR DISPLAYING NEW INFORMATION ON A CATHODE RAY TUBE DISPLAY AND ROLLING OVER PREVIOUSLY DISPLAYED LINES

[75] Inventor: Ernest Paul Lee, Acton, Mass.

[73] Assignee: Honeywell Information Systems, Inc., Waltham, Mass.

[21] Appl. No.: 729,338

[22] Filed: Oct. 4, 1976

[51] Int. Cl.[2] .................. G06F 3/14

[52] U.S. Cl. .................. 340/324 AD; 178/30; 340/154

[58] Field of Search .......... 340/324 A, 324 AD, 334, 340/152, 154; 178/30

[56] References Cited

U.S. PATENT DOCUMENTS

| | | | |
|---|---|---|---|
| 3,011,164 | 11/1961 | Gerhardt | 340/324 AD |
| 3,680,077 | 7/1972 | Hoberecht | 340/324 AD |
| 3,742,288 | 6/1973 | Albrecht | 340/324 AD |
| 3,891,792 | 6/1975 | Kimura | 340/324 AD |

*Primary Examiner*—Marshall M. Curtis
*Attorney, Agent, or Firm*—William F. White; George Grayson; Nicholas Prasinos

[57] ABSTRACT

A communications terminal having a video output wherein new data is displayed on the bottom line of the CRT and each line of previously displayed data is moved up one line. Logic internal to the terminal increments the address of the storage locations within a memory to accomplish this. The new data being displayed replaced the oldest data stored in the memory.

26 Claims, 8 Drawing Figures

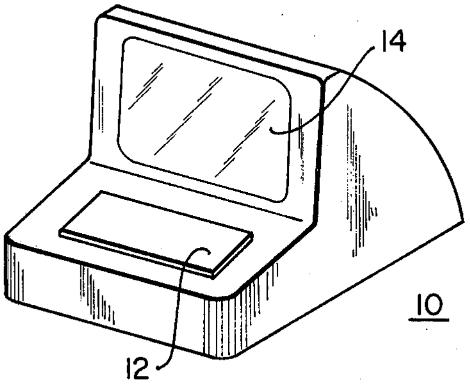
FIG. 1
FIG. 2
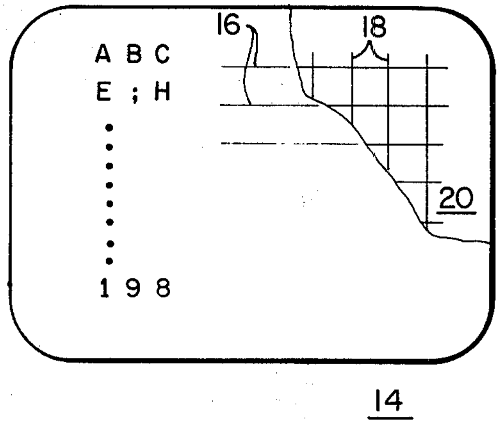
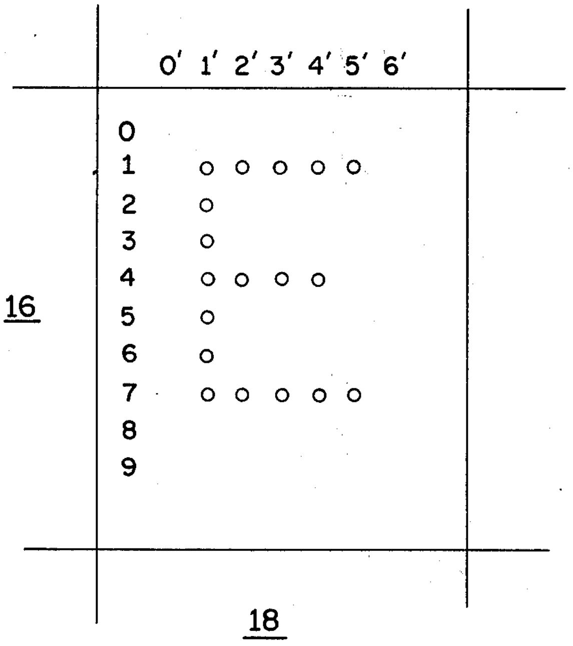
FIG. 3

ROW ADDRESS SEQUENCE FROM THE MULTIPLEX CIRCUIT 58

| |
|---|
| 0 |
| 1 |
| 2 |
| 3 |
| 4 |
| 5 |
| 6 |
| 7 |
| 8 |
| 9 |
| 10 |
| 11 |

ROW ADDRESS SEQUENCES TO THE MEMORY 28 FOR ROW FEED COUNTS—"R.F."

| R.F.=0 | R.F.=1 | R.F.=2 | ...... | R.F.=11 | R.F.=0 |
|---|---|---|---|---|---|
| 0 | 1 | 2 | | 11 | 0 |
| 1 | 2 | 3 | | 0 | 1 |
| 2 | 3 | 4 | | 1 | 2 |
| 3 | 4 | 5 | | 2 | 3 |
| 4 | 5 | 6 | | 3 | 4 |
| 5 | 6 | 7 | ........ | 4 | 5 |
| 6 | 7 | 8 | | 5 | 6 |
| 7 | 8 | 9 | | 6 | 7 |
| 8 | 9 | 10 | | 7 | 8 |
| 9 | 10 | 11 | | 8 | 9 |
| 10 | 11 | 0 | | 9 | 10 |
| 11 | 0 | 1 | | 10 | 11 |

FIG. 8

APPARATUS FOR DISPLAYING NEW INFORMATION ON A CATHODE RAY TUBE DISPLAY AND ROLLING OVER PREVIOUSLY DISPLAYED LINES

BACKGROUND OF THE INVENTION

1. Field of the Invention

This invention relates generally to the video display of information on a display apparatus. In particular, this invention relates to the manner in which information is initially entered and thereafter displayed on a communications terminal.

2. Description of the Prior Art

Information which is to appear on a video display of a communications terminal is often first stored in a memory within the terminal device itself. This stored information is sequentially accessed from the memory and subsequently displayed on a cathode ray tube commonly known as a CRT. The sequential accessing from memory and subsequent display of information on the CRT is usually accomplished at a sufficiently rapid rate so as to create the impression of a continuous image to the viewer. In this regard, the image usually appears as a number of distinct rows of characters arranged across the CRT.

In order to preserve continuity in the image thus being viewed, it is common practice to initially enter new information of the bottommost row of the video display. The previously-appearing rows of characters are simultaneously moved upwardly on the display so that the data previously appearing in the bottommost row reappears in the row next to the bottommost row. In this manner, each succeeding row reappears one row above its previous display position. This is commonly referred to as a "roll-over" of displayed information.

In order to internally facilitate the aforementioned roll-over of information, it has heretofore been a common practice to rearrange the rows of information within the memory portion of the display device. In this regard, the previous bottommost row is erased from that portion of memory dedicated to storing the bottommost row so as to allow for the subsequent storage of the new information that is to constitute the new bottommost row. At the same time, each of the other rows appearing above the previous bottommost row is erased from its particular memory location so as to accommodate the immediately preceding row. In this manner, the previous bottomost row is subsequently restored as the next-to-bottom row whereas the topmost row which had been previously displayed would be erased and no longer internally stored within memory.

It is to be appreciated that a considerable amount of time is thus expended in the reconfiguration of the internal memory during a roll-over of displayed information. It is furthermore to be appreciated that a considerable amount of logic must be dedicated to the task of reconfiguring the internal memory on a timely basis. Finally, it is to be appreciated that this logic must be operational for long periods of time when new information is sequentially being displayed on a display device.

OBJECTS OF THE INVENTION

It is therefore an object of this invention to provide new and improved apparatus for rolling over information on a video display.

It is another object of this invention to provide apparatus for accomplishing a roll-over without a complete reconfiguration of the stored information within memory.

It is still a further object of this invention to provide new and improved apparatus for accomplishing a roll-over in a manner which minimizes the amount of logic dedicated thereto.

SUMMARY OF THE INVENTION

The above objects are achieved according to the present invention by providing apparatus that minimizes the amount of time and logic necessary to perform a roll-over of information on a video display. This is accomplished by a continual adjustment of the addressing used to access locations within the internal memory of the display apparatus. This adjustment to addressing occurs for both an entry of information as well as a display of information.

The above addressing adjustment is accomplished by maintaining a count of the number of rows of information that have already been entered. This count is subsequently added to the row portion of each address used in accessing locations within memory. In this manner, the address used to access memory is automatically adjusted for either an entry of data into memory or a display of data from memory. In the event of an entry operation, information is stored at the next row address for new information. In the event that a display operation is to occur, the address which is used to access stored information within the memory is adjusted by the number of rows of new information that have been entered so that the accessed row is physically moved upwardly on the CRT a distance equal to the number of rows of new information.

BRIEF DESCRIPTION OF THE DRAWINGS

For a better understanding of the present invention, reference should be made to the accompanying drawings wherein:

FIG. 1 depicts a keyboard entry computer terminal with a video display;

FIG. 2 depicts an exemplary video display appearing on the computer terminal of FIG. 1;

FIG. 3 depicts a particular character formed on the exemplary video display of FIG. 2;

FIG. 8 illustrates in further detail the addressing feature of FIG. 7.

DESCRIPTION OF THE PREFERRED EMBODIMENT

Figure 4:
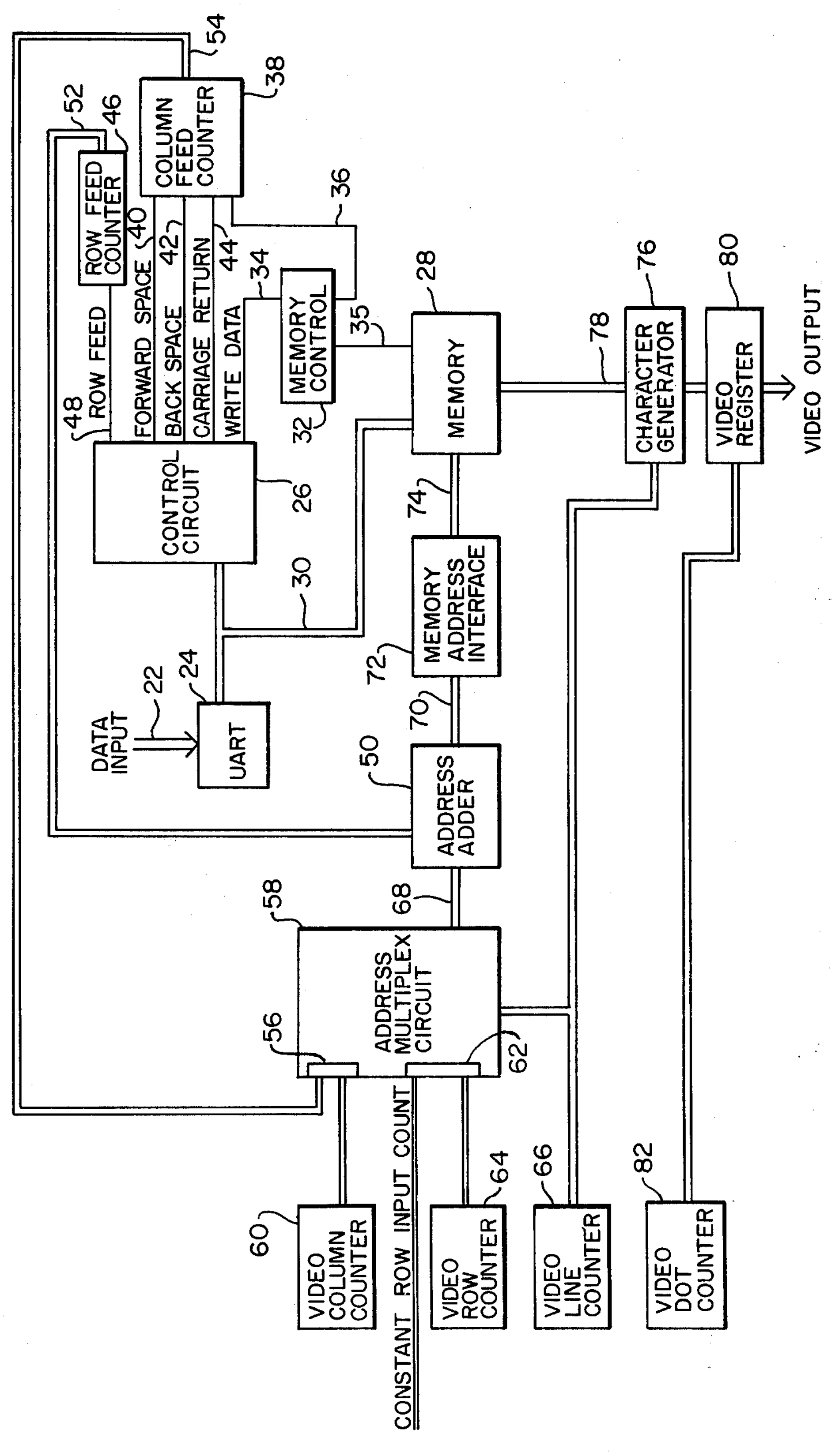
FIG. 4 illustrates in block diagram form the logic utilized to achieve the video display of FIGS. 2 and 3.

Referring to FIG. 1, a communications terminal 10 is depicted with a data entry capability consisting of a keyboard 12 and a data display capability in the form of a video display 14. The video display 14 is capable of displaying information entered through either the keyboard 12 or received from an external communication line attached to the terminal 10.

Referring now to FIG. 2, the video display 14 of FIG. 1 has been enlarged for the purpose of illustrating a particular arrangement of alphanumeric characters thereon. In this regard, a plurality of rows 16 are seen to occur across the video display 14. Each row contains a number of alphanumeric characters sequentially formed from left to right in accordance with an ordered column arrangement as is illustrated by the columns 18. It is to be appreciated that the display of characters in FIG. 2 is in accordance with a matrix 20 consisting of rows such as 16 and columns such as 18. Such an arrangement of characters is formed row by row with each character sequentially formed from left to right in the column locations within a given row.

Referring now to FIG. 3, a particular row and column location has been illustrated in detail for the purpose of showing the formation of the alphanumeric character. The particular alphanumeric character illustrated is that of the letter "E" which is seen to comprise a plurality of illuminated dots. The character is formed by sequentially illuminating dots along a group of horizontal lines 0–9 beginning with the second horizontal line. Dots are illuminated within a particular horizontal line beginning with the second dot location, 1', and extending through the sixth dot location, 5'. The horizontal line counts are thus identified as 0 through 9 whereas the vertical dot counts are indicated as 0' through 6' in FIG. 3. It is to be noted that the dot counts begin at 1' and extend through 5' whereas the line counts begin at 1 and extend through 7. It is to be appreciated that a character is not formed during a line count of 8, 9 or 0.

Having now reviewed the manner in which the video display 14 is formed in a character-by-character fashion, it is now appropriate to turn to FIG. 4 which illustrates in block diagram form the internal logic essential to forming the characters appearing on the display 14. In this regard, the display logic of FIG. 4 first receives a data input from either the keyboard 12 of the terminal 10 or an external communications source to the terminal 10. This data input is subsequently processed through the display logic of FIG. 4 and exits as a video output to be displayed on the video display 14.

The data input appears at a terminal 22 and consists of either a seriallized flow of information from an external communication line or a parallel input from the keyboard 12 with a character being defined when seven data bits are received from either source. The seven data bits are preferably binary encoded in accordance with the standard seven-bit ASCII code as the same is set forth in numerous publications including FIG. 1 of NBS Technical Note 478, issued May 1969, and entitled, "Some Evolving Conventions and Standards for Character Information Coded in Six, Seven and Eight Bits." This ASCII code provides a particular encoding scheme which differentiates between characters that are subsequently to be displayed and characters that are merely to serve as internal control for the communications terminal 10. This differentiation between control characters and display characters is accomplished by stipulating that the sixth and seventh bits of the seven-bit character be equal to binary zero.

The data input appearing on the terminal 22 is applied to a uniform asynchronous receiver transmitter 24 hereinafter referred to as a UART. The UART 24 converts the data input for each character into a seven-bit parallel output. UARTs of this type are entirely conventional and, besides being commercially available, are found in a number of digital communication receivers. The seven-bit parallel output from the UART 24 is applied to both a control circuit 26 as well as a memory 28 via a conduit 30. The control circuit 26 first of all decodes the sixth and seventh bits of the seven-bit parallel input from the UART 24 so as to determine whether or not the seven-bit character is a control character or a display character. If a display character is identified, then a write data signal is generated and applied to a memory control 32 via a line 34. The memory control circuit 32 subsequently conditions the memory 28 via a line 35 for receipt of the seven-bit character appearing on the conduit 30. The memory control 32 moreover generates a signal over a line 36 which increments a column feed counter 38. The column feed counter 38 thereby maintains a column count of the newly-entered information of the memory 28. It will be remembered from a discussion of FIG. 2 that each character occupies a particular column position within a row and hence each time an additional character is entered, the same must be counted as a column increment.

The column feed counter 38 also receives three additional signals from the control circuit 26, namely, a forward space signal, a back space signal, and a carriage return signal. These signals are received over lines 40, 42 and 44 respectively. Each of these signals corresponds to a particular columnar spacing that may occur within the particular row being entered. It is to be noted that each signal is generated by the control circuit 26 pursuant to the decoding of a particular control character. When a control character is thus decoded, the write data signal remains inoperative thereby not activating the memory control 32. In this manner, a control character is never stored in the memory 28.

The control circuit 26 is also operative to produce a row feed signal in response to the particular control character indicating the same. The row feed signal is applied to a row feed counter 46 over a line 48. The row feed counter 46 maintains a cyclical row feed count equal to the number of newly-entered rows on the video display 14 of FIG. 2. It is to be noted that a maximum of twelve possible newly-entered rows can be displayed in the preferred embodiment. This is due to the fact that only twelve rows are displayable at any one time in the preferred embodiment. The row feed count in the preferred embodiment cycles between binary zero and eleven. This cyclical row feed count is applied to an address adder 50 over a bus 52.

Returning now to the column feed counter 38, it is to be noted that the same applies a column feed count signal over a conduit 54 to the column count input side 56 of an address multiplex circuit 58. The column input 56 of the address multiplex circuit 58 also receives a video column count from a video column counter 60. The column feed count and the video column count are preferably seven-bit cyclical counts defining an eighty column count corresponding to eighty character positions in a given row on the video display 14 of FIG. 2.

It is also to be noted that the address multiplex circuit 58 contains a row input terminal 62 which receives a four-bit video row count from a video row counter 64 as well as a constant input row count. In the preferred embodiment, the constant input row count is set at a binary eleven which identifies the twelfth and bottommost row in the video display 14. As will become apparent hereinafter, this input row count guarantees that the latest information to be entered into the memory 28 will always be in the bottommost row position of the video display 14.

The address multiplex circuit 58 is operative to selectively gate either the input row count and the column feed count or the video row and column counts dependent on the video line count from a video line counter 66. It will be remembered from the discussion of FIG. 3 that a character is not displayed during a video line count of eight, nine or zero. This particular line count to the address multiplex circuit 58 permits the selective gating of the constant row input count and the column feed count. When the video line count is other than eight, nine or zero, the video row and column counts are selectively gated by the address multiplex circuit 58. The selectively gated row and column counts from the address multiplex circuit 58 form the initial address which is applied to the address adder 50 via the conduit 68. The address adder 50 is operative to add the row feed count from the bus 52 to the row portion of the address appearing on the conduit 68. The resulting address exits from the address adder 50 on a bus 70 and is subsequently applied to a memory address interface 72. The memory address interface 72 adjusts the resulting address from the address adder 50 so as to conform to the addressing within the memory 28.

The adjusted memory address is applied to the memory 28 via a conduit 74. The adjusted address defines a location within the memory 28 for either a storage operation or a display operation. In the event that a storage operation is to take place, the adjusted address defines a location in memory into which the character is to be stored. If on the other hand, a display operation is to occur, then the character stored at the particular adjusted address location within memory is made available to a character generator 76. The character generator 76 subsequently generates each line of the dot pattern for the character. This information is loaded into a video register 80 pursuant to a line count from the video line counter 66. The stored dot pattern for the particular line count is thereafter serially shifted from the video register 80 in response to the dot count from the video dot counter 82. The dot information is subsequently displayed in a continuous illuminated path by the rastor sweep of the CRT. A visual representation of the character thus appears at the particular row and column location defined by the original video row and column counts.

It is to be noted that the rastor sweep of the CRT is slaved to a master clock which also drives the video dot counter 82. In this manner, a common clocking is maintained between the various video counts and the rastor sweep of the CRT. It is also to be noted that a definitive relationship exists between the various video counts in the preferred embodiment. In this regard, the video column counter cycles through eighty column counts during each particular row count. At the same time, the video line counter provides ten individual line counts within each column count whereas the video dot counter provides seven separate dot counts within each column count. The line count and dot counts are of course dictated by the character formation requirements of FIG. 3 whereas the row and column counts are dictated by the row and column arrangement of FIG. 2.

Figure 5:
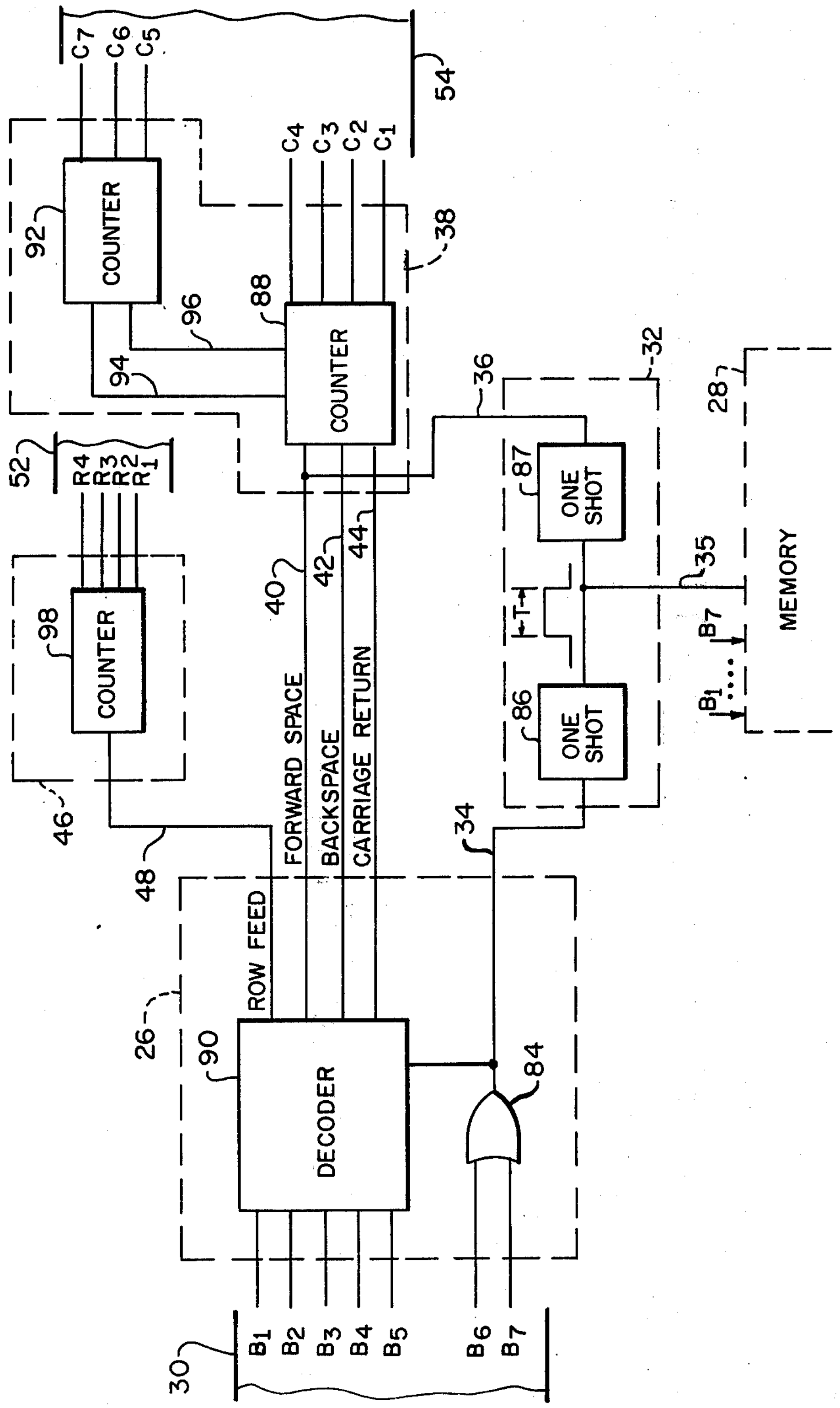
FIG. 5 illustrates in further detail the control logic of FIG. 4.

Turning now to FIG. 5, the control circuit 26 and memory control 32 as well as the row feed counter 46 and the column feed counter 38 are shown in greater detail. In this regard, the various elements are similarly labelled as they appear in FIG. 4.

The seven-bit character from the UART 24 is applied to the control circuit 26 as bits $B_1$ through $B_7$. These bits have been previously encoded according to the standard seven-bit ASCII code. In this regard, bits 6 and 7 of the ASCII code denote a control character when both bits are equal to zero and indicate a data character in all other cases. The control circuit 26 of FIG. 5 makes use of this distinction by separately gating bits $B_6$ and $B_7$ through an OR gate 84.

The OR gate will be logically high when either $B_6$ or $B_7$ are equal to one, thereby triggering a one-shot 86 within the memory control 32. The one-shot 86 provides a pulse of length "T" which is applied to the memory 28. The length "T" of the pulse is such as to allow the memory 28 to store the bits $B_1$ through $B_7$ which have been previously identified by the control circuit 26 as being data. The length "T" of the pulse is hence governed by the response time of the memory 28 which in the preferred embodiment is a MOS-RAM memory having a 1K × 1 storage capacity. The particular memory chip that has been selected in the preferred embodiment is that of Intel memory chip 2102 having a storage response time of 500ns. Details of the operation of this memory chip can be found in the Intel Data Catalog, 1976, by Intel Corporation, Santa Clara, California.

The trailing edge of the output pulse from the one-shot 86 also triggers a second one-shot circuit 87 within the memory control 32. The output pulse from the one-shot 87 increments a four-bit counter 88 within the column counter 38 so as to update the column feed count. The column feed count now reflects the immediately preceding storage of the data character within the memory 28.

The operation of the control circuit 26 for a control character begins with the output of the AND gate 84 being low as a result of bits $B_6$ and $B_7$ being equal to zero. The low-level output of the AND gate 84 conditions a decoder 90 which subsequently decodes bits $B_1$ through $B_5$ that are applied thereto. In the preferred embodiment, bits $B_1$ through $B_5$ are encoded according to the standard ASCII code which provides the following bit encodings for the four outputs necessary to practice the present invention:

| | $B_1$ | $B_2$ | $B_3$ | $B_4$ | $B_5$ |
|---|---|---|---|---|---|
| Forward Space | 0 | 1 | 0 | 0 | 1 |
| Back Space | 0 | 0 | 0 | 1 | 0 |
| Carriage Return | 1 | 0 | 1 | 1 | 0 |
| Row Feed | 0 | 1 | 0 | 1 | 0 |

The above five-bit groups are each decoded in such a manner that the respective control signal goes high when the particular control operation is identified by the decoder 90. In other words, if bits $B_1$ to $B_5$ indicate a forward space, then the forward space signal on the line 40 will go logically high thereby incrementing the four-bit counter 88 within the column feed counter 38.

The four-bit counter 88 also receives similar high level signals indicating a back space via a line 42 and a carriage return via a line 44. The four-bit counter 88 includes three separate terminals which separately respond to these particular signals. In this regard, the forward incrementing signals via lines 40 and 36 are applied to an up-clock terminal whereas the back space signal is applied to a down-clock terminal and the carriage return signal is applied to a clear terminal. In this manner, the four-bit counter 88 is either forward incremented, back incremented or completely cleared.

In order to implement an 80-column count within the column feed counter 38, it is necessary to tie in a second four-bit counter 92 to the first four-bit counter 88. This is accomplished by borrow and carry links 94 and 96 between the two four-bit counters as shown. The 80-column feed count from column feed counter 38 includes the four-bit output lines $C_1$ through $C_4$ from the four-bit counter 88 as well as the first three bit output lines $C_5$ through $C_7$ of the four-bit counter 92. It is to be noted that the four-bit counters 88 and 92 are conventional and are commercially available. An example of such a four-bit counter is the Texas Instruments counter 74LS161. Details of the operation of this counter can be found in "The Integrated Circuit Catalog for Design Engineers," First Edition, by Texas Instruments, Dallas, Texas.

The row feed control signal is applied to a four-bit counter 98 within the row feed counter 46 in much the same manner as has been previously described with respect to the control signals applied to the column feed counter 38. In this regard, the four-bit counter 98 provides a zero through eleven cyclical count via the four-bit output lines $R_1$ through $R_4$. The bit count is incremented within the four-bit counter 98 each time the row feed signal goes logically high in much the same manner as has been previously described relative to the other control signals from the decoder 90.

Figure 6:
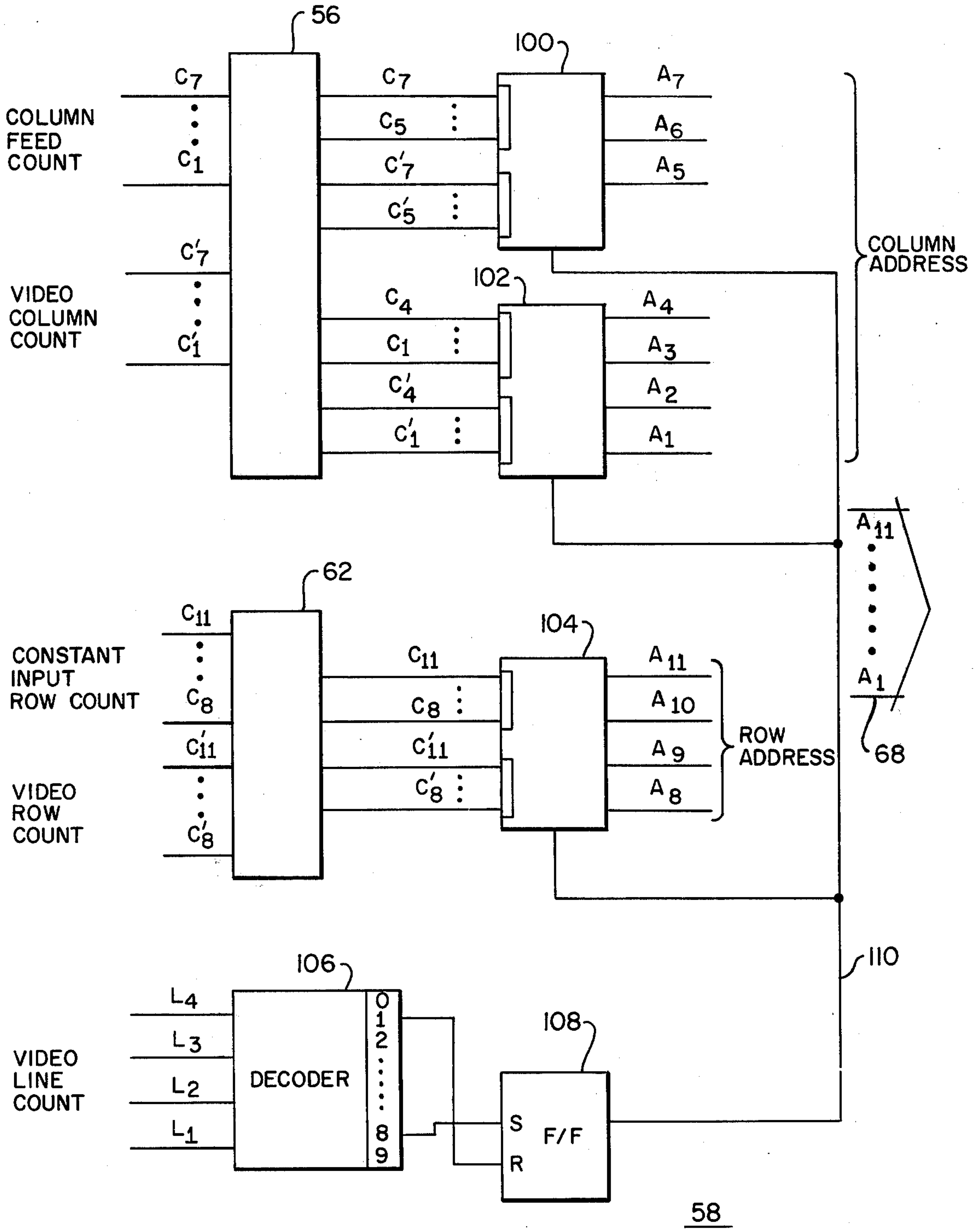
FIG. 6 illustrates in further detail the address multiplex circuit of FIG. 4.

Having now described the manner in which the row feed count and column feed counts are developed, it is now appropriate to turn to the address multiplex circuit 58 which is illustrated in detail in FIG. 6. It will be remembered that the address multiplex circuit 58 receives both a video column count and a video row count as well as a column feed count and a constant input row count. The address multiplex circuit 58 selects either the video counts or the alternative column feed and input row counts depending on the particular line count. The video row and column counts are selected when the video line count is other than 8, 9 or 0.

Turning first to the general terminal 56, it is seen that a column feed count commprising counts $C_1$ through $C_7$ as well as a video column count comprising counts $C'_1$ through $C'_7$ are applied thereto. Bit counts 5 through 7 of each of these seven-bit column counts are applied to a multiplex circuit 100 whereas bit counts 1 through 4 are applied to a multiplex circuit 102. The multiplex circuits 100 and 102 are operative to gate either the video column count bits or the column feed count bits as the column address bits $A_1$ through $A_7$.

The general terminal 62 receives the constant input row count consisting of bit counts $C_8$–$C_{11}$ as well as the video row count consisting of bit counts $C'_8$ through $C'_{11}$. These bit counts are in turn applied to a multiplex circuit 104 which selectively gates either the input row count or the video row count as address bits $A_8$ through $A_{11}$.

Each of the individual multiplex circuits 100 through 104 are standard multiplex circuits which are commercially available. An example of such a multiplex circuit is Texas Instruments 74LS157. Details of the operation of this multiplex circuit can be found in "The Integrated Circuit Catalog for Design Engineers", First Edition, by Texas Instruments, Dallas, Texas. Each of the individual multiplex circuits comprise two separate four-bit inputs and one four-bit output. Either of the grouped bit count inputs is selectively gated depending upon the video line count consisting of bits $L_1$ through $L_4$ which are applied to a decoder 106. Each of the outputs 0 through 9 of the decoder 106 is brought high in response to the corresponding line count as defined by the video line bit counts $L_1$ through $L_4$. At a line count of 8, a flip-flop 108 is brought high by the decoder output 8 which enables each of the multiplex circuits 100 through 104 via a line 110. This enabling signal on the line 110 is operative to switch the multiplex circuits so as to thereby gate the counts $C_1$ through $C_{11}$. These counts will continue to appear at the output of the address multiplex circuit as the address bits $A_1$ through $A_{11}$ until a video line count of 1 is reached. The video line count of 1 resets the flip-flop 108 thereby bringing the line 110 logically low so as to switch the multiplex circuits 100, 102 and 104. The multiplex circuits 100–104 selectively gate the video bit counts $C'_1$ through $C'_{11}$ as the address bits $A_1$ through $A_{11}$. In this manner either the video count or the constant input row and column feed count are selectively gated as the respective address bits $A_1$ through $A_{11}$. The column address bits $A_1$ through $A_7$ and the row address bits $A_8$ through $A_{11}$ exit through the conduit 68.

Figure 7:
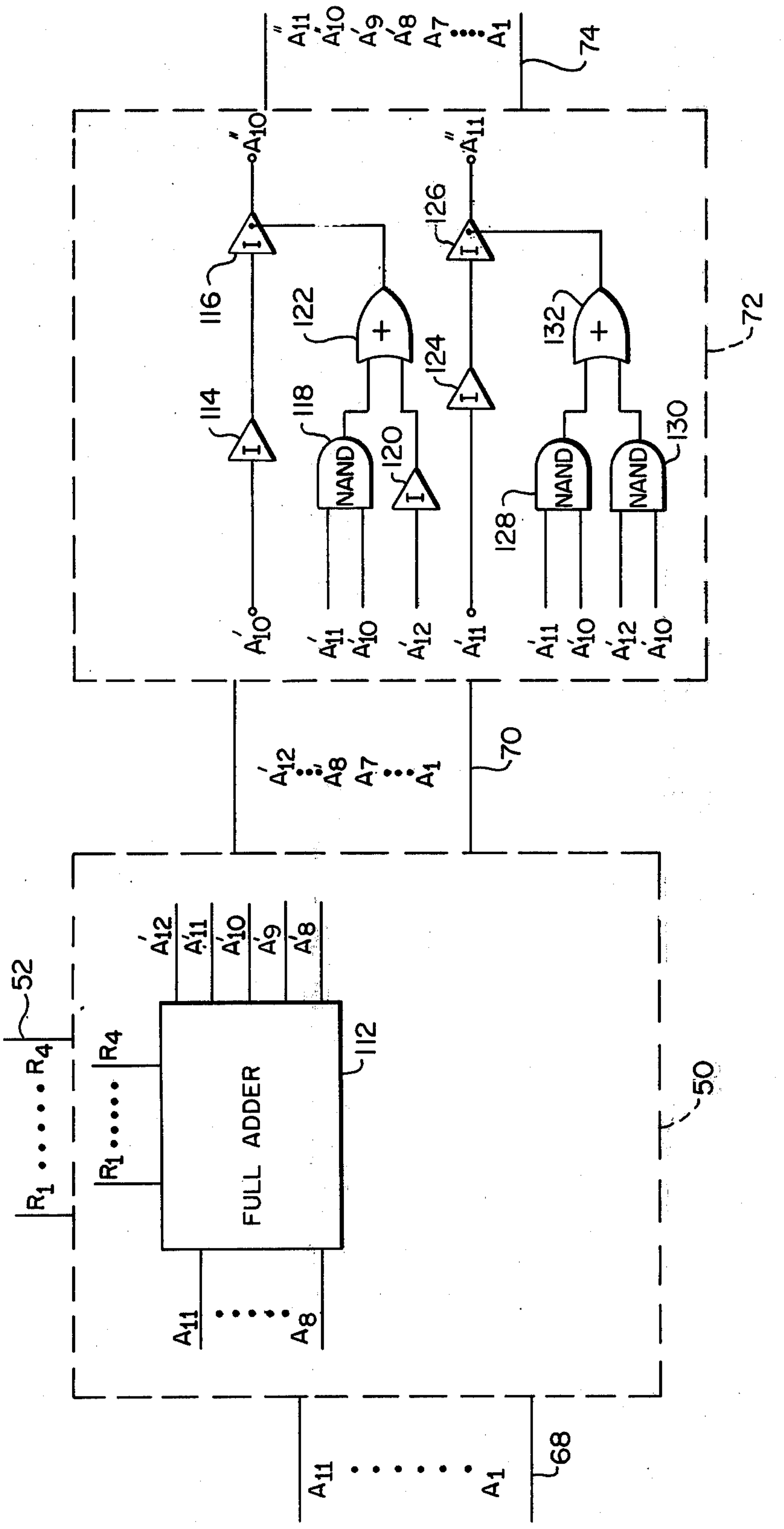
FIG. 7 illustrates in further detail the addressing logic of FIG. 4.

FIG. 7 begins with the address bits $A_1$ through $A_{11}$ being applied to the address adder 50 via the conduit 68. The adder 50 is seen to comprise a full four-bit adder 112 which receives the row address bits $A_8$ through $A_{11}$ respectively. Full four-bit adders of this type are commercially available and include the Texas Instruments adder 74LS283. Details of the operation of this full four-bit adder can be found in "The Integrated Circuit Catalog for Design Engineers," First Edition, by Texas Instruments, Dallas, Texas. The row address bits $A_8$ through $A_{11}$ are added with the row feed count bits $R_1$ through $R_4$ which have been received via the conduit 52 from the row feed counter 46. The full four-bit adder 112 is operative to generate a five-bit address sum comprising the summed address bits $A'_8$ through $A'_{12}$. This five-bit address sum can be as low as zero for a row address of zero summed with a row feed count of zero and as high as twenty-three for a row address of eleven summed with a row feed count of twelve. It is to be noted that the address bits $A_1$ through $A_7$ are not changed within the address adder 50. As a result, the column address bits $A_1$ through $A_7$ exit from the address adder 50 unchanged whereas the row address bits not become the summed address row bits $A'_8$ through $A'_{12}$.

The column address bits $A_1$ through $A_7$ do not subsequently change as they pass through the memory address interface 72. On the other hand, certain of the summed row address bits $A'_8$ through $A'_{12}$ experience further processing within the memory address interface. The necessity for such further processing can be best understood by noting that the summed row address bits $A'_8$ through $A'_{12}$ constitute a five-bit address which must be adjusted downwardly to a four-bit adjusted row address consisting of bits $A''_8$ through $A''_{11}$. In this regard, bits $A'_8$ through $A'_{12}$ which define a possible address range of zero to twenty-three must be adjusted downwardly to an allowable four-bit address range to the memory 28 of zero to eleven. The adjustments which must be made are as follows:

| SUMMED ROW ADDRESSES FROM ADDRESS ADDER 50 | | | | | ADJUSTED ROW ADDRESSES FROM MEMORY ADDRESS INTERFACE 72 | | | |
|---|---|---|---|---|---|---|---|---|
| $A'_{12}$ | $A'_{11}$ | $A'_{10}$ | $A'_9$ | $A'_8$ | $A''_{11}$ | $A''_{10}$ | $A'_9$ | $A'_8$ |
| 0 | 0 | 0 | 0 | 0 | 0 | 0 | 0 | 0 |
| 0 | 0 | 0 | 0 | 1 | 0 | 0 | 0 | 1 |
| 0 | 0 | 0 | 1 | 0 | 0 | 0 | 1 | 0 |
| 0 | 0 | 0 | 1 | 1 | 0 | 0 | 1 | 1 |
| 0 | 0 | 1 | 0 | 0 | 0 | 1 | 0 | 0 |
| 0 | 0 | 1 | 0 | 1 | 0 | 1 | 0 | 1 |
| 0 | 0 | 1 | 1 | 0 | 0 | 1 | 1 | 0 |

-continued

| SUMMED ROW ADDRESSES FROM ADDRESS ADDER 50 | | | | | ADJUSTED ROW ADDRESSES FROM MEMORY ADDRESS INTERFACE 72 | | | |
|---|---|---|---|---|---|---|---|---|
| $A'_{12}$ | $A'_{11}$ | $A'_{10}$ | $A'_9$ | $A'_8$ | $A''_{11}$ | $A''_{10}$ | $A'_9$ | $A'_8$ |
| 0 | 0 | 1 | 1 | 1 | 0 | 1 | 1 | 1 |
| 0 | 1 | 0 | 0 | 0 | 1 | 0 | 0 | 0 |
| 0 | 1 | 0 | 0 | 1 | 1 | 0 | 0 | 1 |
| 0 | 1 | 0 | 1 | 0 | 1 | 0 | 1 | 0 |
| 0 | 1 | 0 | 1 | 1 | 1 | 0 | 1 | 1 |
| 0 | 1 | 1 | 0 | 0 | 0 | 0 | 0 | 0 |
| 0 | 1 | 1 | 0 | 1 | 0 | 0 | 0 | 1 |
| 0 | 1 | 1 | 1 | 0 | 0 | 0 | 1 | 0 |
| 0 | 1 | 1 | 1 | 1 | 0 | 0 | 1 | 1 |
| 1 | 0 | 0 | 0 | 0 | 0 | 1 | 0 | 0 |
| 1 | 0 | 0 | 0 | 1 | 0 | 1 | 0 | 1 |
| 1 | 0 | 0 | 1 | 0 | 0 | 1 | 1 | 0 |
| 1 | 0 | 0 | 1 | 1 | 0 | 1 | 1 | 1 |
| 1 | 0 | 1 | 0 | 0 | 1 | 0 | 0 | 0 |
| 1 | 0 | 1 | 0 | 1 | 1 | 0 | 0 | 1 |
| 1 | 0 | 1 | 1 | 0 | 1 | 0 | 1 | 0 |
| 1 | 0 | 1 | 1 | 1 | 1 | 0 | 1 | 1 |

It is to be noted from the above that the summed row address bits $A'_8$ and $A'_9$ remain unchanged as they exit from the memory address interface 72 as adjusted row address bits $A''_8$ and $A''_9$. On the other hand, the summed row address bits $A'_{10}$ and $A'_{11}$ sometimes require further processing before exiting as adjusted row address bits $A''_{10}$ and $A''_{11}$. This processing is premised on the following four rules:

| | |
|---|---|
| Rule 1 | If $\overline{A'_{10} \cdot A'_{11}} = 1$ |
| | Then $A''_{10} = \overline{A'_{10}}$ |
| Rule 2 | If $A'_{12} = 1$ |
| | Then $A''_{10} = \overline{A'_{10}}$ |
| Rule 3 | If $\overline{A'_{11} \cdot A'_{10}} = 1$ |
| | Then $A''_{11} = \overline{A'_{11}}$ |
| Rule 4 | If $\overline{A'_{12} \cdot A'_{10}} = 1$ |
| | Then $A''_{11} = \overline{A'_{11}}$ |

It is to be noted that Rules 1 and 2 define when $A'_{10}$ must be inverted whereas Rules 3 and 4 define when $A'_{11}$ must be inverted. The above rules are implemented within the memory address interface 72 by a pair of inversion paths for the summed row address bits $A'_{10}$ and $A'_{11}$. The inversion path for the summed row address bit $A'_{10}$ comprises a first inverter 114 followed by a conditional second inverter 116. The conditional inverter 116 normally cancels out the first inversion by the inverter 114 so as to set the adjusted row address bit $A''_{10}$ equal to $A'_{10}$. The exceptions to this double inversion are set forth in the aforementioned Rules 1 and 2 which are respectively embodied in the NAND gate 118 and the inverter 120. Specifically, the output of the NAND gate 118 is normally high except when $A'_{11}$ and $A'_{10}$ are both high. The latter low condition at the output of the NAND gate 118 passes through an OR gate 122 and is thereafter applied to the conditional inverter 116. The conditional inverter 116 is disabled causing the $\overline{A'_{10}}$ output from the inverter 114 to be merely gated therethrough as $A''_{10}$. In a similar manner, the conditional inverter 116 is also disabled in response to $A'_{12}$ being logically high. This results in a logically low signal at the output of the inverter 120 which subsequently disables the conditional inverter 116 after passing through the OR gate 122.

Turning now to the inversion path for the summed row address bits $A'_{11}$, it is seen that the same comprises a first inverter 124 followed by a conditional second inverter 126. The conditional inverter 126 normally cancels out the first inversion by the inverter 124 so as to set the adjusted row address bit $A''_{11}$ equal to $A'_{11}$. The exceptions to this double inversion are set forth in the aforementioned Rules 3 and 4 which are physically embodied in the NAND gates 128 and 130. Specifically, the outputs of the NAND gates are normally high except when either $A'_{11}$ and $A'_{10}$ are both high or $A'_{12}$ and $A'_{10}$ are both high. These latter low conditions at the outputs of the respective NAND gates pass through an OR gate 132 and are applied to the conditional inverter 116. The conditional inverter 116 is thereby disabled causing the $\overline{A'_{11}}$ output from the inverter 124 to be merely gated therethrough as $A''_{11}$.

The resulting address exiting from the memory address interface 72 consists of the column address bits $A_1$ through $A_7$ and the adjusted row address bits $A''_8$ through $A''_{11}$. This resulting eleven-bit pattern is applied to the memory 28 which either stores information at the addressed memory location in response to the memory control 28 or otherwise allows access to previously-stored information at the addressed memory location. This latter access to the stored information at the particular memory location is utilized by the character generator 76 to generate a visual representation of the character thereby stored at the particular addressed memory location. This visual representation is subsequently displayed on the video display 14.

FIG. 8 further illustrates the row addressing feature to the memory 28 resulting from the logic of FIG. 7. The column to the left in FIG. 8 shows a row addressing sequence from the multiplex circuit 58 that is applied to the address adder 50. It is to be understood that such a row addressing sequence from the multiplex circuit 58 would occur in a row-by-row display of stored information on the video display 14. The actual row addressing sequences exiting from the memory address interface 72 and applied to the memory 28 are illustrated to the right in FIG. 8. Each row addressing sequence to the memory 28 results from a given row feed count having been combined in the address adder 50 with the row addressing sequence from the multiplex circuit 58. It will be remembered that the row feed counts are generated by the row feed counter 46 in response to row feed signals from the control circuit 26. A row feed signal occurs each time a new row of information has been completely entered into the terminal 10.

As can be seen in FIG. 8, the row addresses from the multiplex circuit 58 are always adjusted within a particular row addressing sequence to the memory 28 by the given row feed count. It is also to be noted that each address sequence to the memory 28 has also been adjusted by the memory address interface 72 so as to agress with the actual addressable locations in the memory.

Turning now to the row addressing sequence for a row feed count equal to one, it is to be noted that each row address from the multiplex circuit 58 has been adjusted upwardly by one. Hence, the actual address locations within the memory 28 which will receive the new row of information are those memory locations with a row address of "0". This is due to the fact that the new information to be entered will always have a constant row input count of "11" to the address multiplex circuit 58. This count is eventually chosen as the row address exiting from the address multiplex circuit 58 for certain video line counts. The row address of "11" subsequently becomes "0" when a row feed count of "1" is added thereto. It is to be understood that the sum of "12" resulting from adding the row feed count of "1" to a row address of "11" is adjusted to "0" by the address interface 72.

At the same time, the row of information previously entered, during a row feed count of "0" into those memory locations with a row address of "11" now appears in the eleventh sequential display position for the row address sequence occurring during a row feed count of "1". The new row of information stored in those memory locations with a row address of "0" is now in the twelfth sequential display position. Hence, the previously-entered row of information appears as the eleventh row on the video display 14 whereas the new row of information appears as the twelfth row.

For a row feed count of eleven, it is to be noted that the original row of new information that was stored during a row feed count of "0" in those memory locations with a row address of "11" now appears in the topmost sequential display position. In this regard, ten additional rows of new information have been entered and stored in address memory locations 0 through 9. The remaining memory address location "10" receives the row of newest information which is subsequently displayed as the bottommost row on the display 14.

It is also to be noted that each addressed memory location that is to store the newest row of information will always have previously stored the row of oldest information. This can be observed by examining a previous row addressing sequence to the memory 28 wherein the row address appearing in the first sequential address position will have contained the oldest information. This row address next appears in the bottommost sequential position of the succeeding address row sequence. It is therefore to be appreciated that each incremented roll-over of information provides for an erasure of only the oldest information within the memory 28.

From the foregoing, it is to be understood that a preferred embodiment has been illustrated in FIGS. 4–7 and described herein. In this regard, it is to be appreciated that the display logic set forth in FIGS. 4–7 may vary without departing from the scope of the invention. For example, the 80-column by 12-row display requirements for the logic are merely illustrative of a more generalized display consisting of "*m*" columns and "*n*" rows.

What is claimed is:

1. A communications terminal having a video output which displays characters in locations defined by row and columnar positions, said terminal comprising:

means for producing video row and column counts defining the location on the video output that is to display signals representative of a character;

memory means having a plurality of addressable storage locations, for storing a number of rows of characters which are subsequently to be displayed;

means for generating signals representative of a row feed count and a column feed count;

means for generating a row input count indicative of where a new character is to be stored in said memory ; and addressing means coupled to said memory, said means for generating a row input count, and means for generating video row and column counts, for accessing locations within said memory during a display operation when a character stored in an addressable location is to be displayed, and during a storage operation when a character is to be stored in an addressable location, said addressing means comprising:

input means for selectively gating the signals representative of said video row and row input counts during a display and a storage operation respectively;

means for combining coupled to said input means, said row feed means with said memory means, said means combining said input row count with the row feed count during said storage operation so as to generate a resultant row address for storing in a last row of locations of said memory means the characters of a first row, and said means for combining including means for combining said video row count with the row feed count to generate a video row address for addressing said memory means for displaying said first row of characters along a bottom row of said video output; and means for incrementing coupled to said row feed counter means, said incrementing means being operative in response to a control signal to increment the row count by one and said incremented resultant video row address for addressing said memory means to display said first row of characters along a row next to said bottom row and during a storage operation for conditioning said memory to write a second row of characters into a first row of memory locations for display along said bottom row of video output thereby enabling storage and display of a number of most recently entered rows of characters.

2. The communications terminal of claim 1 wherein said means for generating row and column feed counts comprises:

cyclical counting means for maintaining the count of the number of rows of new characters which have been stored in said memory, and cyclical counting means for maintaining the count of the number of characters stored within the newest row of characters.

3. The communications terminal of claim 2 wherein the row input count remains constant during all display and storage operations.

4. The communications terminal of claim 2 wherein the locations on the video output are defined by a number of discrete rows numbered from zero to "*n*" and wherein said cyclical counting means for maintaining the count of the number of rows of new characters which have been stored comprises:

a counter having a plurality of binary outputs which are operative to define row feed counts of zero to "n".

5. The communications terminal of claim 4 wherein said means for combining the row input count with the selectively gated row and column counts comprises:

a full adder means for adding the row input count to the selectively gated row count, said full adder means being operative to produce combined row counts of zero to "2*n*".

6. The communications terminal of claim 5 wherein said means for accessing addressable storage locations further comprises:

memory address interface means for converting the combined row counts of zero to "2n" From said full adder into memory row addresses of zero to "n".

7. The communications terminal of claim 6 wherein the row input count is constant and equal to "n" during all display and storage operations.

8. The communications terminal of claim 7 further comprising:

control means for dtermining when a storage operation or a display operation is to occur, said control means being operative to enable said memory means for a storage operation.

9. The communications terminal of claim 8 wherein said selective gating means comprises:

timing means for defining when a storage operation is to occur and when a display operation is to occur.

10. The communications terminal of claim 1 wherein said selective gating means comprises:

timing means for defining when a storage operation is to occur and when a display operation is to occur.

11. The communications terminal of claim 10 wherein said means for accessing addressable storage locations within said memory further comprises:

memory addresses interface means for converting the combined row and column count output from said combining means into a memory address.

12. The communications terminal of claim 11 wherein said means for generating row and column feed counts comprises:

cyclical counting means for maintaining the count of the number of rows of new characters which have been stored in said memory, and cyclical counting means for maintaining the count of the number of characters stored within the newest row of characters.

13. The communications terminal of claim 12 wherein the row input count remains constant during all display and storage operations.

14. The communications terminal of claim 10 further comprising:

control means for determining when a storage operation or a display operation is to occur, said control means being operative to enable said memory means for a storage operation.

15. The communications terminal of claim 1 wherein the row input count remains constant during all display and storage operations.

16. Apparatus for displaying a number of rows of information, said apparatus comprising:

a memory having a plurality of addressable storage locations;

means for storing rows of characters in the addressable storage locations within said memory;

means for maintaining a stored row count of the number of rows of characters which have been stored;

means for maintaining a display row count indicative of a position within an ordered arrangement of display rows wherein a row of stored characters can be displayed;

means for combining the display row count with the stored row count so as to define a combined row display count;

means, responsive to said combined row display count, for accessing the stored contents of the addressable locations within memory;

means for generating representations of the stored contents accessed from said addressable storage locations in such a manner that a first row of characters is displayed on a bottom row and previously displayed rows of characters are displayed adjusted upwardly one row;

means for incrementing said stored row count, and means for combining the display row count with the incremented stored row count so as to define an incremented combined row display count;

means responsive to said incremented combined row display count for accessing the stored contents of the addressable locations within memory; and means for generating representations of the stored contents accessed from said addressable storage locations in such a manner that a second row of characters is displayed on the bottom row, the first row of characters is displayed on a next to bottom row and the previously displayed rows of characters are displayed adjusted upwardly one row.

17. The apparatus of claim 16 wherein the number of ordered rows for display is "n + 1," and said means for maintaining the stored row count of the rows which have been stored comprises:

cyclical counting means for maintaining a cyclical stored row count from zero to "n".

18. The apparatus of claim 17 wherein said means for combining the display row count and the stored row count comprises:

adder means for adding the display row count with the cyclical stored row count, said adder means being operative to produce combined display row counts of zero to "2n".

19. The apparatus of claim 18 wherein said means for defining a memory row address comprises:

means for converting the combined display row counts of zero to "2n" from said adder means to memory row addresses of zero to "n".

20. The apparatus of claim 16 wherein said means for storing a row of characters in addressable storage locations comprises:

means for maintaining a new row count indicative of the position within the ordered arrangement of display rows wherein a new row of information can first be displayed;

means for combining the new row count with the stored row count so as to generate a combined row storage count; and means, responsive to said combined row storage count for addressing storage locations within memory so as to allow a row of characters to be stored therein.

21. The apparatus of claim 20 wherein said means for storing the characters in addressable storage locations further comprises:

means for converting the combined row storage count into a memory row address compatible with the addressable storage locations within the memory.

22. The apparatus of claim 20 wherein the new row count indicative of the position within the ordered arrangement of display rows wherein a new row of information is to be first displayed remains constant for all storage operations.

23. The apparatus of claim 22 wherein the ordered arrangement of display rows comprises a number of rows of information occupying row positions numbered zero to "n" and the new row count indicative of the position within the ordered arrangement of display rows wherein a new row of information is to be first displayed is a constant equal to "$n$".

24. The apparatus of claim 23 wherein said means for maintaining the stored row count of the number of rows which have been stored comprises:

cyclical counting means for maintaining a cyclical stored row count from zero to "$n$".

25. The apparatus of claim 24 wherein said means for combining the new row count with the stored row count comprises:

adder means for adding the new row count of "$n$" to said cyclical stored count of zero to "$n$" to produce combined row storage counts of zero to "$2n$".

26. The apparatus of claim 25 wherein said means for addressing storage locations within memory so as to allow a row of characters to be stored therein comprises:

means for converting the combined row storage counts of zero to "$2n$" from said adder means into memory row addresses of zero to "$n$".

* * * * *